US008260996B2

(12) United States Patent
Wolfe

(10) Patent No.: US 8,260,996 B2
(45) Date of Patent: *Sep. 4, 2012

(54) INTERRUPT OPTIMIZATION FOR MULTIPROCESSORS

(75) Inventor: Andrew Wolfe, Los Gatos, CA (US)

(73) Assignee: Empire Technology Development LLC, Wilmington, DE (US)

( * ) Notice: Subject to any disclaimer, the term of this patent is extended or adjusted under 35 U.S.C. 154(b) by 672 days.

This patent is subject to a terminal disclaimer.

(21) Appl. No.: 12/429,580

(22) Filed: Apr. 24, 2009

(65) Prior Publication Data

US 2010/0274941 A1  Oct. 28, 2010

(51) Int. Cl.
G06F 13/24 (2006.01)
(52) U.S. Cl. ........................ 710/269; 710/267
(58) Field of Classification Search ........... 710/267–269
See application file for complete search history.

(56) References Cited

U.S. PATENT DOCUMENTS

| 4,047,161 | A |   | 9/1977  | Davis             |         |
|-----------|---|---|---------|-------------------|---------|
| 4,482,954 | A |   | 11/1984 | Vrielink et al.   |         |
| 4,779,194 | A |   | 10/1988 | Jennings et al.   |         |
| 4,964,040 | A |   | 10/1990 | Wilcox            |         |
| 5,065,310 | A | * | 11/1991 | Stone             | 718/100 |
| 5,179,707 | A |   | 1/1993  | Piepho            |         |
| 5,283,904 | A |   | 2/1994  | Carson et al.     |         |
| 5,313,584 | A |   | 5/1994  | Tickner et al.    |         |
| 5,371,872 | A |   | 12/1994 | Larsen et al.     |         |
| 5,379,428 | A |   | 1/1995  | Belo              |         |
| 5,410,710 | A |   | 4/1995  | Saragdhar et al.  |         |
| 5,452,452 | A |   | 9/1995  | Gaetner et al.    |         |
| 5,555,420 | A | * | 9/1996  | Sarangdhar et al. | 710/266 |
| 5,564,060 | A |   | 10/1996 | Mahalingaiah et al. |       |
| 5,613,128 | A |   | 3/1997  | Nizar et al.      |         |
| 5,646,676 | A |   | 7/1997  | Dewkett et al.    |         |
| 5,889,978 | A |   | 3/1999  | Jayakumar         |         |
| 5,918,057 | A |   | 6/1999  | Chou et al.       |         |
| 5,944,809 | A | * | 8/1999  | Olarig et al.     | 710/260 |
| 6,148,361 | A |   | 11/2000 | Carpenter et al.  |         |
| 6,205,508 | B1|   | 3/2001  | Bailey et al.     |         |
| 6,219,690 | B1| * | 4/2001  | Slingwine et al.  | 718/102 |
| 6,418,497 | B1|   | 7/2002  | Guthrie et al.    |         |
| 6,779,065 | B2|   | 8/2004  | Murty et al.      |         |
| 6,983,339 | B1|   | 1/2006  | Rabe et al.       |         |
| 6,996,745 | B1|   | 2/2006  | Shaylor           |         |

(Continued)

FOREIGN PATENT DOCUMENTS

EP  0 602 858 A1  6/1994

(Continued)

OTHER PUBLICATIONS

U.S. Official Action dated Aug. 25, 2010 in U.S. Appl. No. 12/423,368.

(Continued)

*Primary Examiner* — Paul R Myers
(74) *Attorney, Agent, or Firm* — Hope Baldauff Hartman LLC

(57) ABSTRACT

Technologies are described herein for allocating interrupts within a multiprocessor computing system. Information communicated to an interrupt controller module can support allocating interrupt response resources so as to maintain processor affinity for interrupt service routines. This affinity can support caching efficiency by executing a specific interrupt handler on a processor that previously executed that interrupt handler. The caching efficiency may be balanced against the benefits of assigning execution of the interrupt hander to another processor that is currently idle or currently processing a lower priority task.

23 Claims, 8 Drawing Sheets

U.S. PATENT DOCUMENTS

| | | | |
|---|---|---|---|
| 7,003,611 B2 | 2/2006 | Arndt | |
| 7,039,740 B2 | 5/2006 | Glasco et al. | |
| 7,117,285 B2 * | 10/2006 | Ota | 710/265 |
| 7,191,349 B2 | 3/2007 | Kaushik et al. | |
| 7,197,627 B1 | 3/2007 | Naylor | |
| 7,328,294 B2 * | 2/2008 | Kim et al. | 710/260 |
| 7,350,005 B2 | 3/2008 | Yiu et al. | |
| 7,386,002 B2 | 6/2008 | Meier | |
| 7,461,215 B2 | 12/2008 | Hass | |
| 7,581,052 B1 * | 8/2009 | Solomita | 710/267 |
| 7,594,234 B1 | 9/2009 | Dice | |
| 7,627,706 B2 * | 12/2009 | Kaushik et al. | 710/268 |
| 7,634,642 B2 | 12/2009 | Hochschild et al. | |
| 7,685,347 B2 | 3/2010 | Gibbs | |
| 7,809,876 B2 | 10/2010 | Balasubramanian | |
| 7,899,966 B2 | 3/2011 | Kulkarni | |
| 2002/0062381 A1 | 5/2002 | Gargiulo et al. | |
| 2002/0087775 A1 | 7/2002 | Looi et al. | |
| 2003/0101301 A1 | 5/2003 | Taniguichi | |
| 2005/0010707 A1 | 1/2005 | Francis | |
| 2006/0026322 A1 | 2/2006 | Chauvel et al. | |
| 2006/0200826 A1 | 9/2006 | Tamura et al. | |
| 2007/0106827 A1 | 5/2007 | Boatright et al. | |
| 2007/0256076 A1 | 11/2007 | Thompson et al. | |
| 2008/0140896 A1 | 6/2008 | Todoroki et al. | |
| 2009/0089470 A1 | 4/2009 | Ven | |
| 2009/0204932 A1 | 8/2009 | Bormann et al. | |
| 2009/0248934 A1 | 10/2009 | Ge et al. | |
| 2009/0320031 A1 | 12/2009 | Song | |
| 2009/0327556 A1 | 12/2009 | Railing et al. | |
| 2010/0262742 A1 | 10/2010 | Wolfe | |
| 2010/0274879 A1 | 10/2010 | Wolfe | |
| 2010/0287556 A1 | 11/2010 | Munz | |
| 2011/0087815 A1 | 4/2011 | Kruglick | |

FOREIGN PATENT DOCUMENTS

| | | |
|---|---|---|
| EP | 0 685 798 A2 | 12/1995 |
| EP | 0 827 084 A2 | 3/1998 |
| EP | 2 241 979 A1 | 10/2010 |
| JP | 2000-029719 A | 10/2001 |
| JP | 2001-290660 A | 10/2001 |
| WO | WO 95/18416 A1 | 7/1995 |

OTHER PUBLICATIONS

European Search Report dated Jul. 2, 2010 in EP Serial No. 10154704.0.

U.S. Official Action dated Nov. 26, 2010 in U.S. Appl. No. 12/426,368.

U.S. Official Action dated Jan. 21, 2011 in U.S. Appl. No. 12/578,270.

U.S. Notice of Allowance / Allowability dated Mar. 25, 2011 in U.S. Appl. No. 12/423,368.

Goutanis et al., "A method of processor selection for interrupt handling in a multiprocessor system," Dec. 1966, Proceedings of the IEEE, 54(12): 1812-1819.

Jeffay et al., "Accounting for interrupt handling costs in dynamic priority task systems," Dec. 1-3, 1993, Proceeding of the Real-Time Systems Symposium, pp. 212-221.

Manner, R., "Hardware task/processor scheduling in a polyprocessor environment," Jul. 1984, IEEE Transactions on Computers, C-33(7): 626-636.

Qu et al., "Design and implementation of RTU based on the embedded operation system μC/OS-II," Apr. 5-8, 2008, Proceedings of the 2004 IEEE International Conference on Electric Utility Deregulation, Restructuring and Power Technologies, vol. 2, pp. 623-626.

U.S. Official Action dated Jun. 8, 2010 in U.S. Appl. No. 12/423,368.

Intel, "Protection," Intel® 64 and IA-32 Architectures Software Developer's Manual, vol. 3A, System Programming Guide, Part1, Chapter 5, Sep. 2009, 50 pages.

Intel, Intel® 64 Architecture x2APIC Specification, Sep. 2007, 39 pages.

Intel, Intel® 64 Architecture x2APIC Specification, Jun. 2008, 49 pages.

U.S. Official Action dated Jul. 15, 2011 in U.S. Appl. No. 12/578,270.

U.S. Official Action dated Nov. 29, 2011 in U.S. Appl. No. 12/578,270.

U.S. Official Action dated Dec. 14, 2011 in U.S. Appl. No. 12/429,539.

International Search Report and Written Opinion dated Feb. 9, 2012 in PCT Application No. PCT/US10/52244.

U.S. Official Action dated Mar. 20, 2012 in U.S. Appl. No. 12/429,539.

Cesário, W., et al., "Component-Based Design Approach for Multicore SoCs," Proceedings of the 39th Conference on Design Automation, Jun. 10-14, 2002, pp. 6.

Raj, H. and Schwan, K., "Implementing a Scalable Self-Virtualizing Network Interface on an Embedded Multicore Platform," pp. 6.

Smolens, J.C., et al., "Reunion: Complexity-Effective Multicore Redundancy," Proceedings of the 39th Annual IEEE/ACM International Symposium on Microarchitecture, 2006, pp. 12.

U.S. Notice of Allowance dated Apr. 18, 2012 in U.S. Appl. No. 12/578,270.

* cited by examiner

INTERRUPT OPTIMIZATION FOR MULTIPROCESSORS

BACKGROUND

Interrupts can signal a computing system of an event to be serviced by the execution of an interrupt handler, which may also be known as an interrupt service routine (ISR). Such a signal event can be referred to as an interrupt request (IRQ). A processor can undergo a context switch to transition from its current task to execute the interrupt handler associated with a received interrupt. A transition from the current processor task can be considered an interruption of the current task. Allocating a received interrupt to a particular processor or processor core for execution within a multiprocessor computing system can present additional complications. It is with respect to these considerations and others that the disclosure made herein is presented.

SUMMARY

Technologies are described herein for handling interrupts within a multiprocessor computing system. A multiprocessor computing system can have multiple processors, a processor with multiple processor cores, multiple processors each having multiple processor cores, or any combination thereof. A particular processor, or core, can be determined as the preferred processor for executing a particular interrupt handler. This processor, or processor core, can be referred to as the preferred processor for that specific interrupt handler. Interrupts associated with the interrupt handler can be received. One or more accepting processors can be determined to be candidates for executing the interrupt handler in response to receiving an interrupt. The preferred processor can be assigned to execute the interrupt handler in response to the preferred processor being an accepting processor.

Additional information communicated to an interrupt controller module can support allocating interrupt response resources so as to maintain a processor core affinity for interrupt service routines. This affinity can support caching efficiency by considering a processor that previously executed an interrupt handler as a preferred processor and preferably executing the specific interrupt handler on that processor. The caching efficiency may be balanced against the benefits of assigning execution of the interrupt hander to a different processor that is currently idle or currently processing a lower priority task.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings in which:

DETAILED DESCRIPTION

Figure 1:
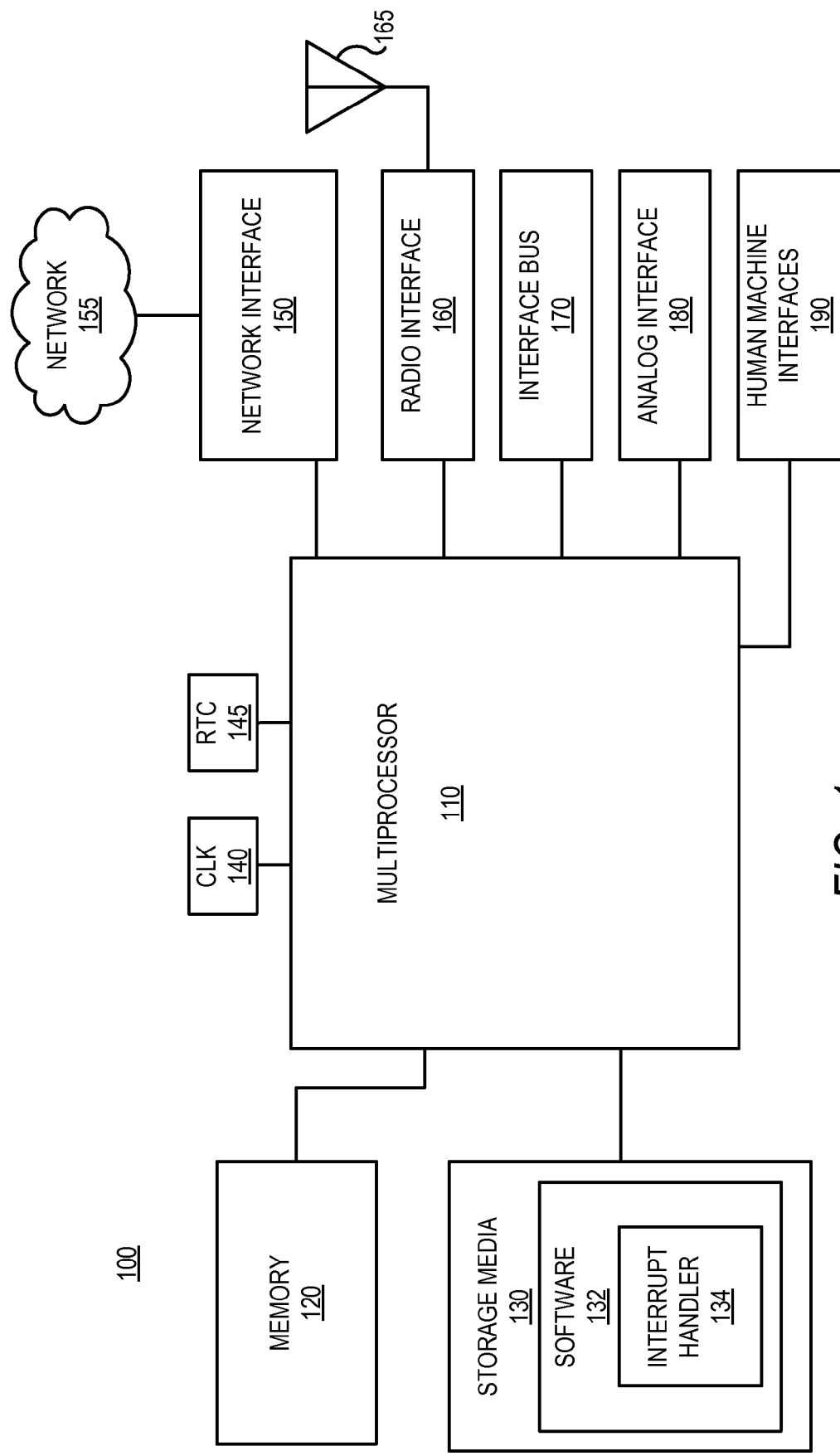
FIG. 1 is a block diagram illustrating an operating environment for a multiprocessor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that embodiments of the present disclosure, as generally described herein, and illustrated in the figures, can be arranged, substituted, combined, separated, and designed in a wide variety of different configurations, all of which are explicitly contemplated herein.

The following disclosure is drawn, inter alia, to methods, apparatus, systems and computer program products related to technologies for allocating an interrupt to a specific processor core within a multiprocessor. Through the use of the technologies and concepts presented herein, scheduling and communicating interrupt responses can provide additional information to an interrupt controller circuit in order to attempt to maintain a processor-core affinity for interrupt service routines. This affinity can support caching efficiency by executing an interrupt handler on a processor that previously executed the interrupt handler. This caching efficiency may also be balanced against the benefits of assigning execution of the interrupt hander to a processor that is currently idle or currently processing a task with a lower priority than the priority of the interrupt handler. Referring now to the drawings, in which like numerals represent like elements through the several figures, aspects of interrupt optimization within multiprocessor systems are described.

Turning now to FIG. 1, a functional block diagram 100 illustrates an operating environment for a multiprocessor 110 according to an embodiment presented herein. A multiprocessor 110 can incorporate multiple processors or processor cores. The multiple cores can generally support parallel processing, parallel tasks, parallel threads, separate sequential processes, or any combination thereof. A memory 120 may be accessed by the multiprocessor 110. The multiprocessor 110 can read from and write to the memory 120. Such reads and writes may relate to both instructions and data associated with operations of the multiple cores of the multiprocessor 110. Generally, each of the processor cores within the multiprocessor 110 may individually access the memory 120. The memory 120 may be RAM, SRAM, DRAM, SDRAM, or any type of volatile or non-volatile memory.

Instructions and data associated with operations on the multiple cores of the multiprocessor 110 may be stored on a storage media 130 device or devices. The storage media 130 may support the nonvolatile storage of information. The storage media 130 may be accessed by the multiple processor cores within the multiprocessor 110. The storage media 130 can store software 132 for execution on the multiple processor cores within the multiprocessor 110. By way of example and not limitation, computer-readable media may comprise computer storage media and communication media. Computer storage media may include volatile, non-volatile, removable, and non-removable media implemented in any method or technology for the storage of information such as computer-readable instructions, data structures, program modules, or other data. Computer storage media may include, but is not limited to, RAM, ROM, EPROM, EEPROM, flash memory, other solid state memory technology, CD-ROM, DVD, HD-DVD, BLU-RAY, other optical storage, magnetic cassettes, magnetic tape, magnetic disk storage, other magnetic storage devices, or any other medium which can be used to store the desired information and which can be accessed by the multiprocessor 110.

Software 132, or other instructions, code, modules, or programs associated with the multiprocessor 110 may include modules for responding to interrupt events. Such a module may be referred to as an interrupt service routine (ISR) or an interrupt handler 134. An interrupt handler 134 may be associated with a specific interrupt event, a specific cause of interrupt, source of interrupt, or a specific interrupt signal line. The interrupt handler 134 may be executed in response to receiving the associated interrupt at the multiprocessor 110. The interrupt handler 134 may interrupt, or preempt, other operations associated with the multiprocessor 110. Such preemption may support executing the interrupt handler 134 in rapid response to the arrival of an interrupt at the multiprocessor 110. Rapid response can support real-time, hard-real-time, soft-real-time, or near-real-time operation of various software modules.

One example of an interrupt handler 134 module may be associated with a device driver, or other software, firmware, or modules associated with supporting external devices. In addition to external devices, such modules may support internal circuit blocks that provide interrupts. The supported device, or an associated interface circuit, may be considered a source of an interrupt associated with the device driver, ISR, or interrupt handler 134. Upon receiving an interrupt signal, the associated interrupt hander 134 may be executed immediately, within a specific time limit, or according to a priority level associated with the interrupt handler 134 and other operations.

An external clock 140 can provide a clock signal to the multiprocessor 110. The external clock 140 may include a crystal oscillator or any other clock or oscillator source. The external clock 140 may include a clock driver circuit. The clock signal associated with the external clock 140 may be used to time and synchronize various circuits within the multiprocessor 110. The multiprocessor 110 may also interface to a real time clock (RTC) 145. The real time clock 145 can be used for maintaining human time, such as time of day, day of week, calendar date, year, and so forth. An RTC 145 may generate interrupt events to the multiprocessor 110 related to timers, alarms, or watchdog circuits.

Various devices that interface to the multiprocessor 110 can generate interrupts. Such interrupts can signal to the multiprocessor 110 that service is requested in response to the interrupt. An interrupt handler 134 may be executed to service the interrupt for the device. As non-limiting examples, several different devices are illustrated in FIG. 1. For example, an interrupting device may be a network interface 150. The network interface 150 may be used to attach to a network 155. The network interface 150 can generate an interrupt when a data packet is received from the network 155. An interrupt handler 134 associated with the network interface 150 may then be executed to receive the data packet from the network interface 150. Similarly, a radio interface 160 may use an antenna 165 to send or receive wireless data packets to a wireless network or a mobile communications system.

One or more interface buses 170 may also interface to the multiprocessor 110. Examples of interface buses can include Industry Standard Architecture (ISA) bus, Peripheral Component Interconnect (PCI) bus, PCI-Express bus, Accelerated Graphics Port (AGP) bus, Universal Serial Bus (USB), Advanced Technology Attachment (ATA) bus, Serial ATA (SATA) bus, Small Computer System Interface (SCSI), and other such buses and interfaces used in computers and embedded processor systems. The buses, or interface circuits associated with the buses, may incorporate one or more interrupt mechanisms for interrupting the multiprocessor 110. Analog interfaces 180 may connect to the multiprocessor 110. The analog interfaces 180 may include digital to analog converters, analog to digital converters, or both. The analog interfaces 180 may be used for video, audio, infrared, radar, or any other analog signal. The analog interfaces 180, or circuitry supporting the analog interfaces 180, may generate interrupts to the multiprocessor 110. One or more human-machine interfaces 190 may connect to the multiprocessor 110. Human machine interfaces 190 may include video displays, keyboards, mice, light pens, projectors, speech recognition, switches, buttons, indicators, or any other mechanisms for receiving input from a human or providing output to a human. The human machine interfaces 190, or circuitry associated therewith, may provide interrupts to the multiprocessor 110.

Figure 2:
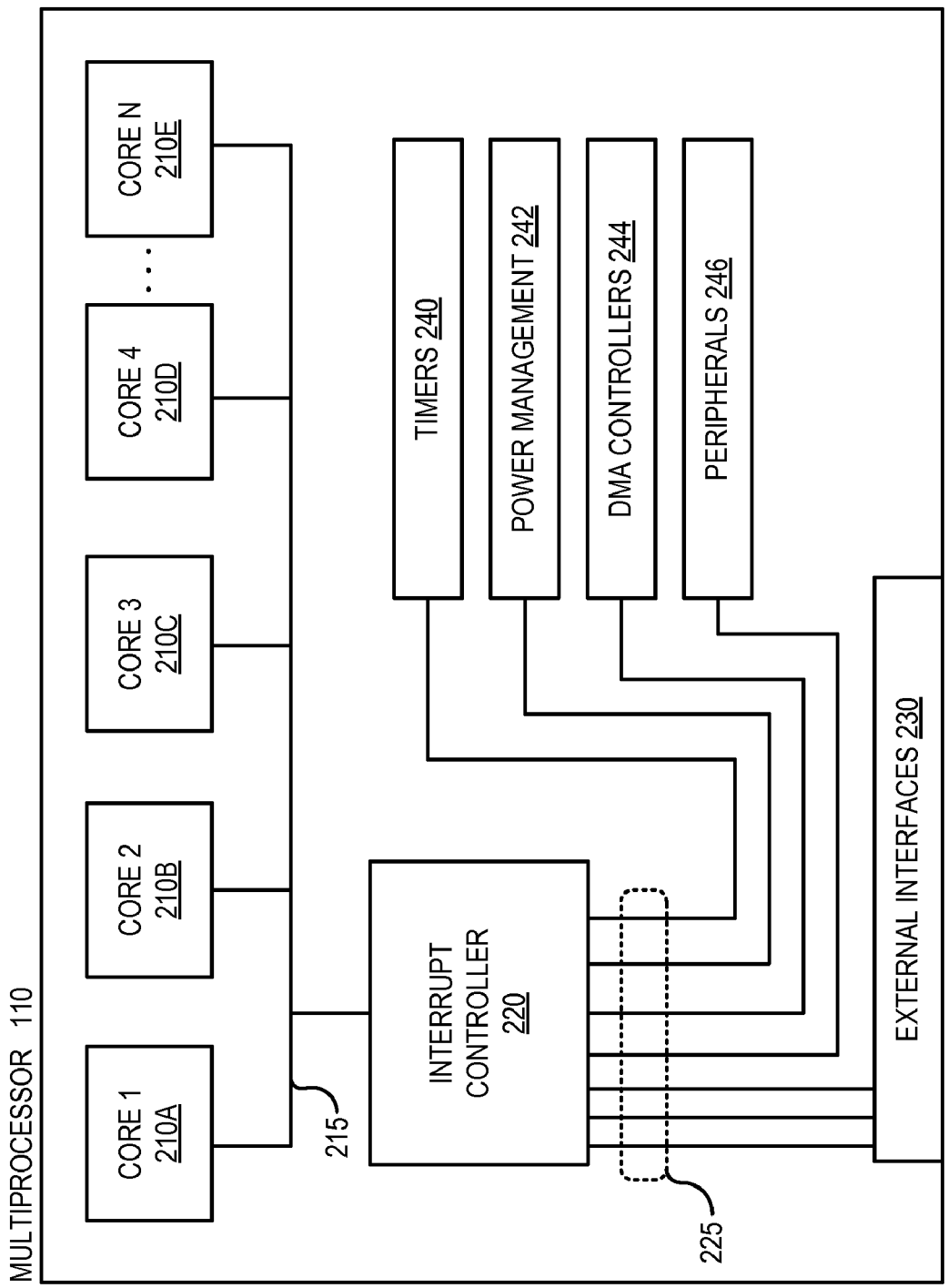
FIG. 2 is a block diagram illustrating a multi-core processor having an interrupt controller.

Turning now to FIG. 2, a block diagram illustrates a multi-core processor having an interrupt controller according to an embodiment presented herein. A multiprocessor 110 may have multiple internal processor cores such as core 1 through core N 210A-210E. These may be referred to collectively, or generally, as processor cores 210. Interrupts arriving to the multiprocessor 110 may come from external interfaces 230. Interrupts associated with the external interfaces 230 may originate from external devices as discussed with respect to FIG. 1. Similarly, devices internal to the multiprocessor 110 may generate interrupts. For example, timers 240, power management mechanisms 242, direct memory access (DMA) controllers 244, or other on-chip peripherals 246 may generate interrupts similar to interrupts originating from the external interfaces 230.

Various interrupt signals from internal devices and the external interfaces 230 may be carried individually on interrupt lines 225 to the interrupt controller 220. Each of the interrupt lines 225 may be associated with a separate interrupt handler 134 or an interrupt handler 134 may be associated with more than one of the interrupt lines 225. The interrupt controller 220 can interface with the processor cores 210 over an interrupt bus 215. The interrupt bus 215 can be a serial bus, a parallel bus, or any channel for communicating signals between the interrupt controller 220 and the multiple processor cores 210. The interrupt bus may be a general-purpose system, I/O, or memory bus that is also used for communicating signals between the interrupt controller 220 and the multiple processor cores 210. The interrupt bus 215 can carry messages relating interrupt information between the interrupt controller 220 and the processor cores 210. The messages communicated on the interrupt bus 215 can be encoded as signals, pulses, logic levels, packets, frames, or any other representation known in the art.

An interrupt can delay a currently executing process by preempting processor execution resources. Swapping from the current task to the interrupt handler 134 can occur by a context switch. A context switch may cause operations to complete out of order. A context switch may cause operations to be aborted and re-executed. A context switch may cause internal buffers be cleared, or caches to be altered. Cache lines and translation lookaside buffer (TLB) entries may be invalidated by the code or data from the interrupt handler 134. Caches can maintain recently accessed data or code in a faster cache memory for rapid subsequent access. This may be beneficial as the notions of repeated access and locality of reference imply that recently accessed memory locations, or those nearby, may be likely candidates for access again in the near future. Interrupt response latency and interrupt processing time may be delayed if code or data associated with the interrupt handler 134 are cached in a modified state on another processor core.

Disruptive effects may be increased in systems where interrupts are frequent; where interrupt service routines involve substantial amounts of code or data; or when a substantial amount of overall computing time is devoted to servicing interrupts. Such conditions can occur in either general-purpose or special-purpose computing systems where there are complex computing tasks involving large amounts of data tied to a real-time schedule. Similar conditions may appear in server computers that are processing large amounts of network traffic or storage system I/O operations. Embedding computing systems are special purpose computing systems embedded within devices or systems often supporting control and communications functions. For example, embedded processors may be applied to engine controllers, robotic controllers, communication devices, modems, mobile phones, remote controls, and a myriad of other applications known in the art. Embedding computing systems may perform much of their computing time responding to interrupts. Thus, efficiency of multiprocessor 110 operations within an embedded environment may benefit substantially from improved techniques for allocating resources to interrupts in an effective and efficient manner.

Interrupts may be periodic or at least be repeatedly executed within a computing system. The same code and data may commonly be used in each instance of executing a specific interrupt handler 134. Improved efficiency in executing the interrupt handler 134 may be supported where code and data resources are already allocated to responding processor core. This pre-allocation may also involve the code or data already being cached at the responding processor core thereby incurring improved cache efficiencies. Thus, allocating the execution of a specific interrupt handler 134 to the processor core that handled the previous instance of that interrupt handler 134 can improve efficiency.

In certain cases, the processor core that executed the previous instance of a specific interrupt handler 134 may be busy with a current task when the interrupt arrives. If the current task is a high priority task, context switching to execute the interrupt handler 134 may be delayed or prohibitively disruptive. If the current task associated with the processor is a low priority task, the current task may be preempted or delayed in order to execute the interrupt handler 134. In either case, other processor cores may be idle or executing even lower priority tasks, and therefore assigning the interrupt to one of the other processors may support improved system efficiency over preempting or waiting on the preferred processor.

There may be caching efficiency associated with executing an interrupt handler 134 on a processor that previously executed the same interrupt handler 134. Alternatively, there may be task priority motivation for assigning execution of the interrupt hander 134 to a different processor that may be currently idle or processing a low priority task. A balance between these two efficiencies may be achieved using a score, or cost, that can be established by adding, combining, or weighting together these efficiency factors. The score, or cost, may then be used to determine interrupt allocation.

Figure 3:
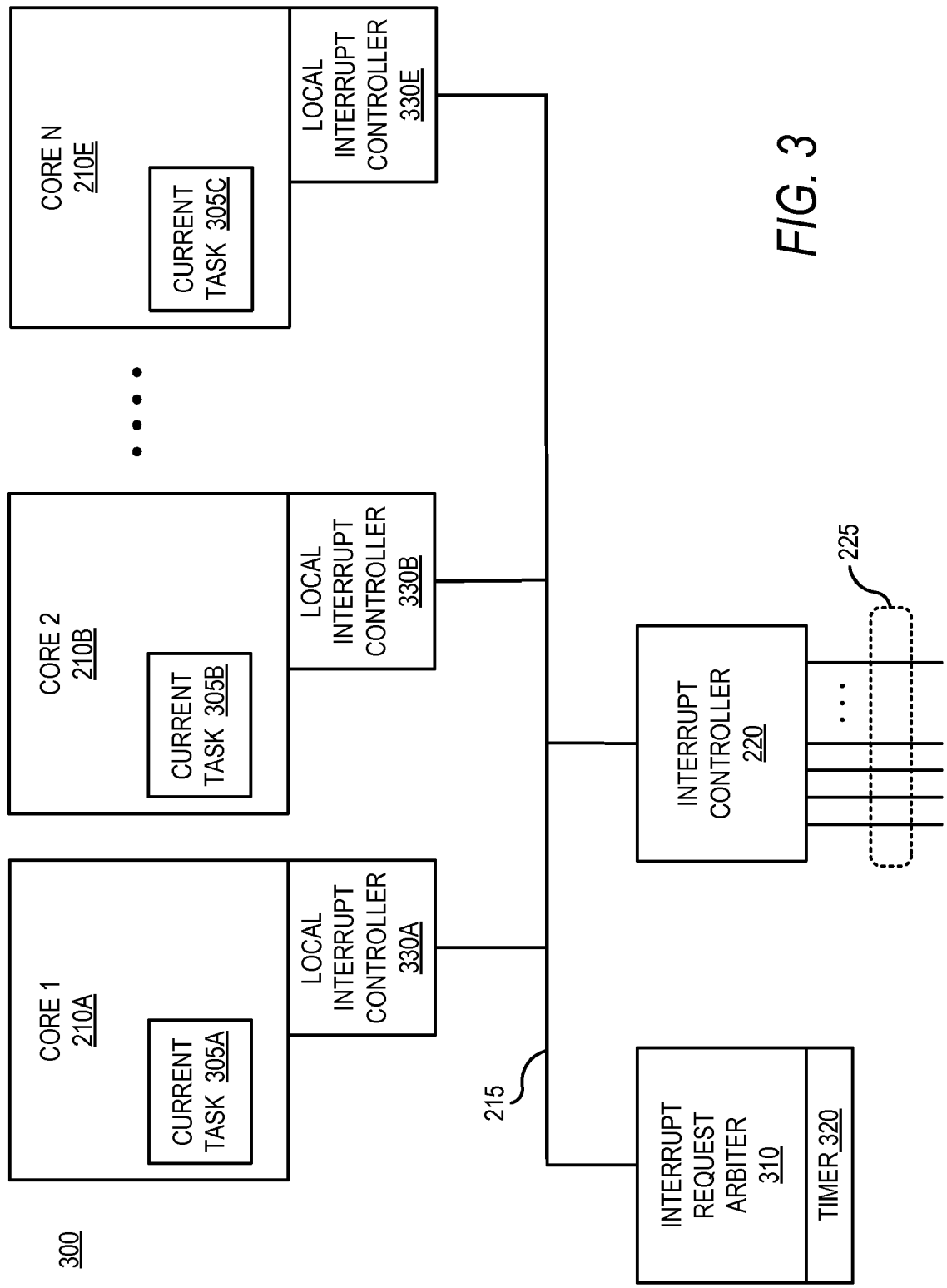
FIG. 3 is a block diagram illustrating an interrupt controller and an interrupt request arbiter within a multi-core processor.

Turning now to FIG. 3, a block diagram 300 illustrates an interrupt controller 220 and an interrupt request arbiter 310 within a multi-core processor according to aspects of an embodiment presented herein. An interrupt controller 220 can receive and latch interrupt requests arriving on one or more interrupt lines 225. In response to an interrupt request event, the interrupt controller 220 can identify which of the processor cores 210 is the preferred responder to the interrupt. A preferred responder can be established based upon being the previous core to execute the interrupt handler 134 for the pending interrupt. This preferred responder status can be said to maintain a core affinity between the interrupt handler 134 and the preferred core. For the initial instance of executing a specific interrupt handler, another technique for establishing the preference may be used since there is no previous execution. This initial core affinity, or base case core preference, may be established randomly, statically specified, assigned by a measure of the least busy core, assigned by a measure of one or more system parameters, or by any other technique for determining an initial preferred core.

Upon receiving an interrupt, the interrupt controller 220 can determine a priority level for the interrupt handler 134 associated with the pending interrupt. This priority level can be determined from a data table in a memory or other circuitry. An identifier of the preferred core along with the priority level for the interrupt handler 134 can be communicated from the interrupt controller 220 to one or more processor cores 210 over an interrupt bus 215. In an instance where the information is communicated to all of the processor cores 210, the communication can be referred to as a broadcast on the interrupt bus 215. A message sent to the processor cores 210 indicating that an interrupt is pending can be referred to as an interrupt message. An interrupt message can be used to provoke the processor cores 210 to offer themselves as acceptors, or accepting cores, for executing the interrupt handler 134 associated with the pending interrupt.

According to some embodiments, the interrupt controller 220 may determine an eligible core list and provide that list to the processor cores 210 along with the preferred core identifier and the priority level of the interrupt handler 134 within the interrupt message. According to other embodiments, the interrupt controller 220 may determine an eligible core list and only supply the interrupt message information to the processor cores 210 on the eligible list.

Any one of the processor cores 210 can be represented on the interrupt bus 215 by a local interrupt controller 330A-330E. The local interrupt controllers 330A-330E can be referred to collectively, or in general, as local interrupt controllers 330. When a message is sent onto the interrupt bus 215 for one or more of the processor cores 210, the message can be received at the local interrupt controller 330 associated with the respective processor core 210. To differentiate from the local interrupt controllers 330, the interrupt controller 220 may also be referred to as the main interrupt controller or the master interrupt controller.

Each local interrupt controller 330 that receives an interrupt message can determine if it will request the assignment to execute the interrupt handler 134 associated with the pending interrupt on the processor core 210 associated with the local interrupt controller 330. This can be done by offering the associated processor core 210 to service the pending interrupt. The determination to request the interrupt or not may be made by examining if the corresponding processor core 210 is eligible. Eligibility may be determined by a hard coded list, a provided system configuration, or by evaluating system characteristics. If eligible, the determination can further depend upon evaluating a priority level of the current task executing on the processor core 210. A current task 305A-305C may be executing on each of the respective processor cores 210. The current tasks 305A-305C may be referred to collectively, or generally, as current tasks 305. At each processor core 210, a priority level associated with the current task 305 executing at the processor core 210 can be compared with the priority level of the interrupt handler 134 as specified in the interrupt message. If a processor core 210 is an eligible core and is executing a current task 305 with a priority level lower than the priority level of the pending interrupt handler 134, the local interrupt controller 330 may request control of the interrupt.

A local interrupt controller 330 may request control of a pending interrupt by communicating a core response message to the interrupt request arbiter 310 over the interrupt bus 215. Such a core response message can include an identifier of the processor core 210 that is sending the message. The core response message can also include a "reject" or "request" indicator to specify if the local interrupt controller 330 associated with the processor core 210 desires to request the pending interrupt or to reject the pending interrupt.

The interrupt request arbiter 310 can evaluate the core response messages. The interrupt request arbiter 310 can determine one processor core 210 to be granted control of the pending interrupt. The other requesting processor cores 210 may be denied control of the interrupt. The interrupt request arbiter 310 can communicate an arbiter message over the interrupt bus 215 to the local interrupt controllers 330. The arbiter message can identify the processor core 210 to be granted the responsibility for servicing the pending interrupt by executing the associated interrupt hander 134. This type of arbiter message can be sent as a broadcast to all local interrupt controllers 330. Such a grant to one processor core 210 can imply that all other processor cores 210 are denied the interrupt. Alternatively, the interrupt request arbiter 310 can communicate an arbiter message to each processor core 210 individually sending a grant message to one processor core 210 and deny messages to the other requesting processor cores 210.

The interrupt request arbiter 310 can preferentially provide control to the preferred processor core 210. As such, if the preferred processor core 210 requests control of the interrupt, it can be granted control while the other requesters may be denied control. If another processor core 210 requests control first, a response to that processor core 210 can be delayed until the preferred processor core 210 either requests control or sends a "reject" message. If the preferred processor core 210 requests control, the other request can be denied and the preferred processor core 210 can be granted control. If the preferred processor core 210 rejects control, the other requesting processor core 210 can be granted control of the interrupt. This approach can support servicing interrupts with improved latency by an available processor core while maintaining affinity to a preferred processor core 210 for each interrupt handler 134.

According to embodiments, the preferred processor core 210 may presume that it will be granted control of the pending interrupt. As such, the preferred processor core 210 can begin processing the interrupt immediately. A request may still be sent so that other requesters can be denied control by the arbiter.

According to embodiments, the interrupt request arbiter 310 can include a timer 320. If the preferred processor core 210 does not respond within the time period of the timer 320, another requesting processor core can be granted control of the pending interrupt. A subsequent request by the preferred processor core 210 may then be denied.

According to embodiments, the interrupt controller 220 can update its assignment of the preferred processor core 210 when a different processor core is assigned control of the interrupt. The arbiter message may be examined by the interrupt controller 220 to determine which core was assigned control of the pending interrupt. If the arbiter message does not assign the pending interrupt to the preferred processor core 210, the interrupt controller 220 can update its assignment of the preferred processor core 210 so that the other processor core 210 that has been granted control of the pending interrupt becomes the new preferred processor core. The new preferred processor core 210 can be used in the next instance of that specific interrupt since it may then be more likely to have code, data, and TLBs related to the interrupt handler 134.

According to embodiments, the preferred processor core can be represented as an ordered list of processor cores. The ordered list can identify the order of preference in which processor cores 210 may be allocated control to respond to the pending interrupt by executing the associated interrupt handler 134. When communicating the preferred list to the local interrupt controllers 330 over the interrupt bus 215, the interrupt controller 220 may broadcast the interrupt message to all of the processor cores 210, a subset of the processor cores 210, only to processor cores 210 on the preferred list, or any combination thereof. The interrupt request arbiter 310 can allocate control of the pending interrupt such that preference is given to the processor cores 210 in the order expressed by the preference list.

The interrupt controller 220, interrupt request arbiter 310, and various local interrupt controllers 330 can be implemented as modules or circuits within the same integrated circuit supporting the processor cores 210. Such an integrated circuit may be referred to as a multiprocessor 110. The interrupt controller 220, interrupt request arbiter 310, and various local interrupt controllers 330 may be implemented as modules or circuits in a separate integrated circuit from the processor cores 210. The processor cores 210 may also be separate individual processors. The integrated circuits discussed can be application specific, programmable integrated circuits such as field programmable gate arrays (FPGA), systems on chip, system on substrate, system on package, or implemented in any other approach for integrating or packaging circuitry. While illustrated and discussed as separate modules or circuits, the interrupt controller 220, interrupt request arbiter 310, and various local interrupt controllers 330 may be functionally combined in any combination or partitioned differently without departing from the spirit and scope of the technology disclosed herein. Together, the interrupt controller 220, interrupt request arbiter 310, interrupt bus 215, various local interrupt controllers 330, in any combination, or any subset thereof may be referred to as an interrupt allocation system.

Figure 4:
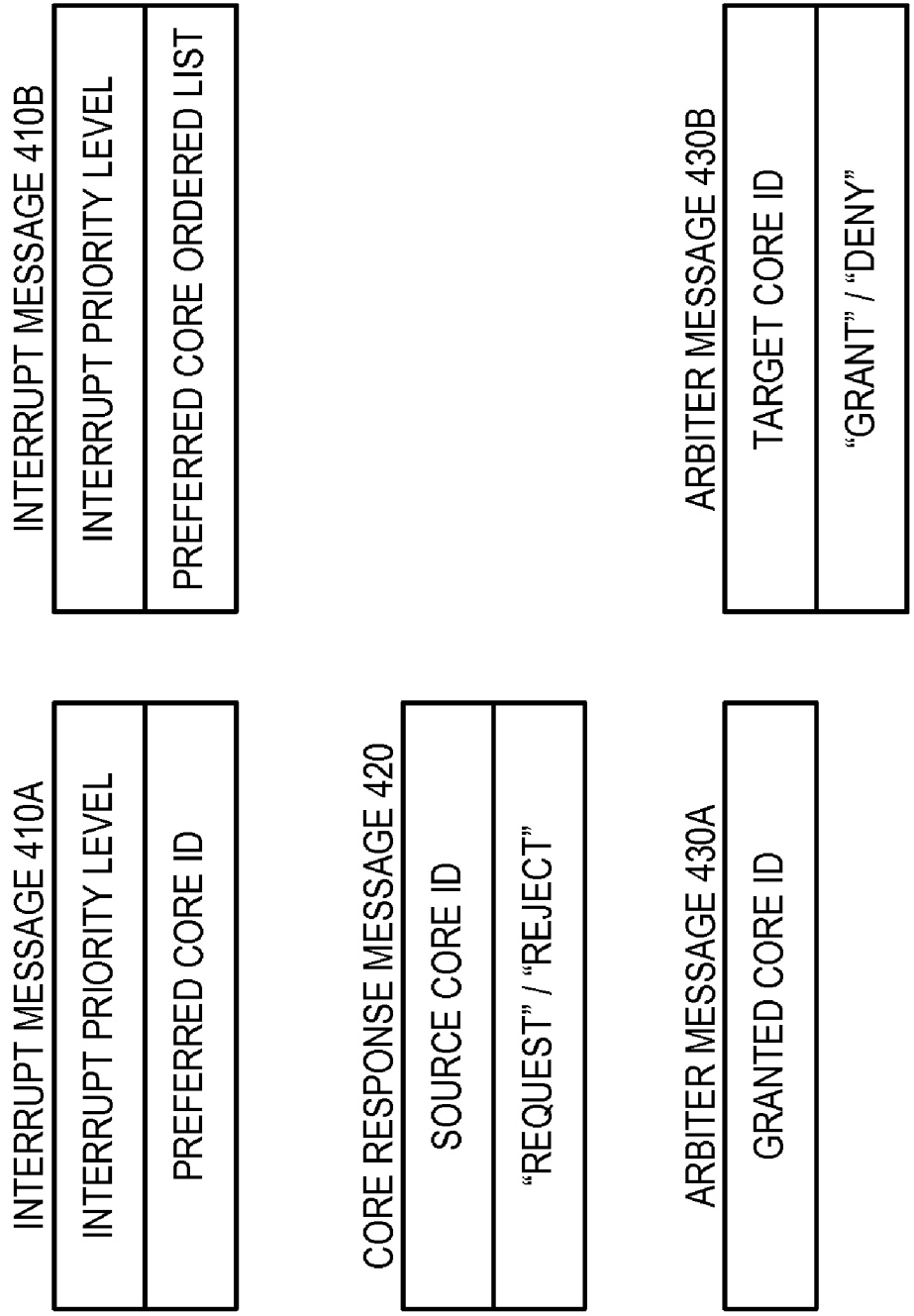
FIG. 4 is a data structure diagram illustrating interrupt messages.

Turning now to FIG. 4, a data structure diagram 400 illustrates interrupt messages according to an embodiment presented herein. An interrupt message 410A-410B is an example of a message that may be transmitted from an interrupt controller 220 over an interrupt bus 215 to multiple processor cores 210. The interrupt message 410A may be used to indicate that an interrupt has arrived from one of the interrupt lines 225 to the interrupt controller 220. The interrupt message 410A can include the interrupt priority level. The interrupt priority level may be a priority level associated with the interrupt handler 134 for servicing the pending interrupt. The interrupt message 410A can also indicate a preferred core ID for identifying the preferred processor core 210 for executing the interrupt handler 134 associated with the interrupt received at interrupt lines 225. Alternatively, a second interrupt message 410B may indicate core affinity by providing an ordered list of core IDs to indicate an ordered preference of processor cores 210 for handling the pending interrupt. The ordered list can indicate, by the order in the list, a preference of processor cores 210 that may execute the interrupt handler 134 associated with the pending interrupt. For example, the ordered list may indicate the most preferred core first and the second preferred core second and so on. The ordering may be based on estimates of cache state with respect to the interrupt handler 134. Such an estimate may be established by basing the ordering on how recently a given core executed the specific interrupt handler.

A core response message 420 may be issued from the local interrupt controllers 330 associated with multiple respective processor cores 210. The core response message 420 can be directed to the interrupt controller 220 and the interrupt request arbiter 310. The core response message 420 can indicate that an individual processor core 210 accepts control of the pending interrupt by requesting assignment of the interrupt from the interrupt request arbiter 310. The core response message 420 may include a source core ID identifying the specific processor core 210 from which the response originates. The core response message 420 may also indicate that the processor core 210 "requests" or "rejects" the pending interrupt.

An arbiter message 430A may be issued from the interrupt request arbiter 310 onto the interrupt bus 215 to indicate granting an interrupt to a particular processor core 210. For example, the arbiter message 430A may include the granted core ID indicating a particular processor core 210 that should execute the interrupt handler 134 to respond to the pending interrupt. The arbiter message 430A may be broadcast to multiple processor cores 210 indicating to the processor cores 210 which core has been allocated the task to execute the interrupt handler 134 associated with the pending interrupt. Alternatively, a second arbiter message 430B may be used to individually communicate granting of the interrupt handler 134 to a particular processor core 210. The arbiter message 430B may include a target core ID for sending a particular arbiter message 430 along the interrupt bus 215 to the specified processor core 210. The arbiter message 430B may also include a "grant" or "deny" indicator to the particular processor core 210 identified by the target core ID. When using the second arbiter message 430B, the interrupt request arbiter 310 may send individual arbiter messages 430B to each processor core 210. These messages may indicate a "deny" to each of the processor cores except for a single "grant" arbiter message 430B sent to the processor core 210 that has been assigned the execution of the interrupt handler 134 for the pending interrupt.

The messages discussed with respect to FIG. 4 may be implemented as packets, signals, control lines, bus signals, or any other mechanism for signaling or communicating between the modules involved in assigning interrupts. These modules may include the interrupt controller 220, interrupt request arbiter 310, various local interrupt controllers 330, and the interrupt bus 215 as discussed with respect to FIG. 3.

Figure 5:
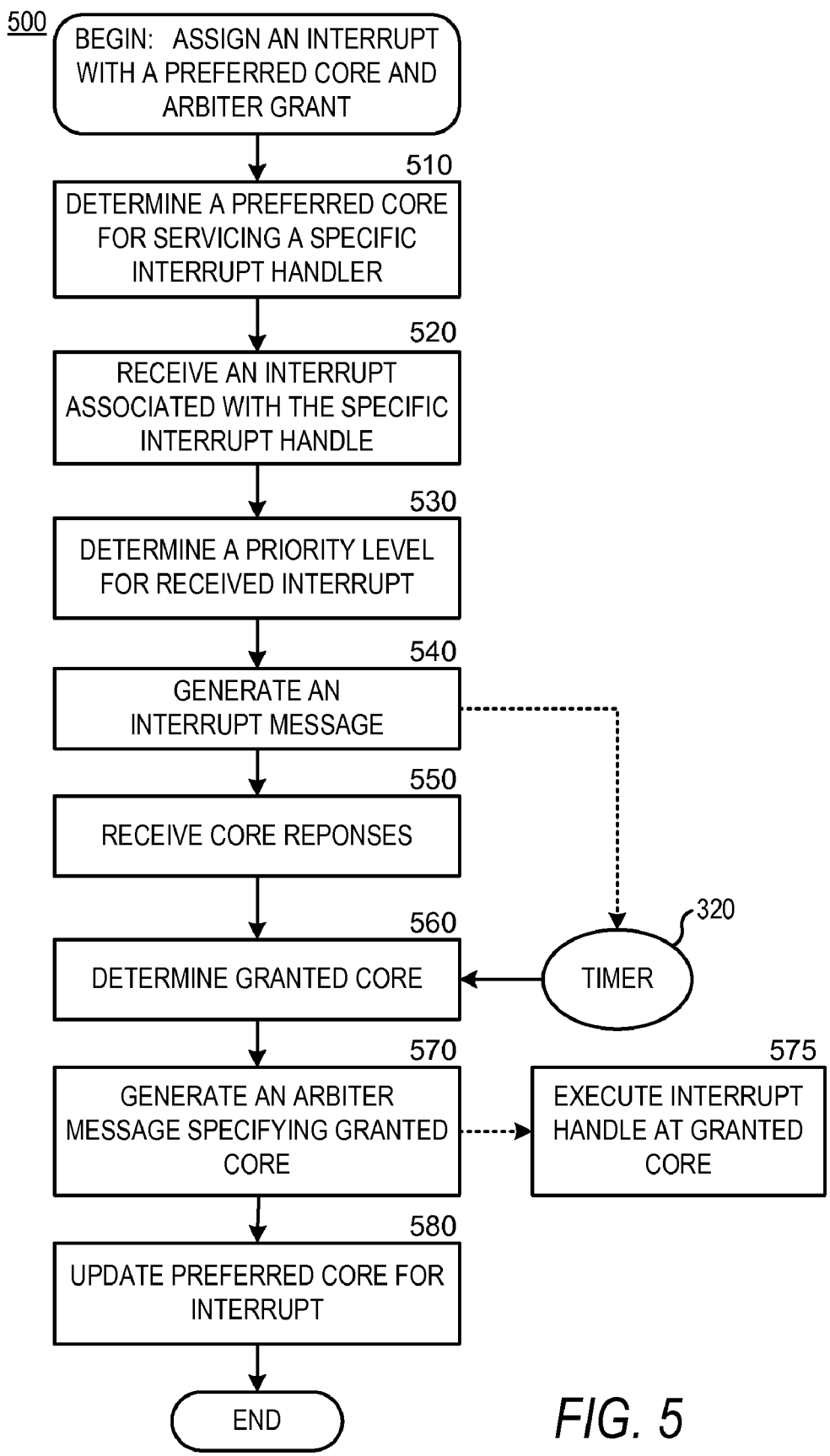
FIG. 5 is a flow diagram illustrating a process for assigning an interrupt with a preferred processor core and arbiter grant.

Referring now to FIG. 5, additional details will be provided regarding the embodiments presented herein for allocation of interrupts within multiprocessors. In particular, FIG. 5 is a flow diagram illustrating aspects of a process 500 for assigning an interrupt using a preferred processor core and arbiter grant according to aspects of an embodiment presented herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as state operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed sequentially, in parallel, or in a different order than those described herein.

The process 500 can begin at operation 510, where a preferred core is determined for preferably servicing a specific interrupt handler 134. Initially a preferred core for a specific interrupt handler 134 may be randomly assigned, pre-specified as a particular core, or assigned through any other initialization mechanism. The initialization may be specified by the operating system, by the BIOS, or by a configuration setting or circuit.

Next at operation 520, an interrupt associated with the specific interrupt handler 134 is received. The received interrupt can arrive on interrupt lines 225 to the interrupt controller 220. At operation 530, a priority level for the received interrupt can be determined. This determination may be based on the source of the interrupt or the particular interrupt line 225 that is involved in signaling the interrupt. At operation 540, an interrupt message 410A can be generated. The interrupt message 410A can be generated by the interrupt controller 220 and transmitted on the interrupt bus 215. The interrupt message can indicate the interrupt priority level as determined in operation 530 and also the preferred core ID as determined in operation 510. The generation of the interrupt message 410A and transmission onto the interrupt bus 215 can also trigger the start of a timer period associated with a timer 320.

Upon arrival of the interrupt messages 410A at the processor cores 210, each local interrupt controller 330 can evaluate if the respective processor core 210 is going to request the interrupt. This may be based on the interrupt having a higher priority than the current task 305 executing on the processor core 210. The local interrupt controller 330 can then generate a core response message 420 to be communicated onto the interrupt bus 215. At operation 550, core response messages 420 may be received at the interrupt request arbiter 310 as well as at the interrupt controller 220.

At operation 560, the interrupt request arbiter 310 can determine a granted core for executing the interrupt service handler 134 associated with the pending interrupt. This determination can be made based on core responses 420 received at operation 550. The core responses 420 received at operation 550 may be ignored if they are received after a time-out period associated with the timer 320. If a core response 420 from the preferred core indicates that the preferred core requests the interrupt, then the interrupt can be assigned to the preferred core. If a core response 420 from the preferred core indicates that the preferred core rejects the interrupt, or if the preferred core does not respond within the timer period, then the interrupt may be allocated to another requesting processor core 210. A requesting processor core 210 can be said to be an accepting core for handling the interrupt.

At operation 570, an arbiter message 430A, 430B can be generated specifying the granted processor core 210. The arbiter message 430A, 430B can be communicated over the interrupt bus 215 to the local interrupt controllers 330 associated with the respective processor cores 210. At operation 575, the granted processor core 210 can be triggered to execute the interrupt handler 134 to service the pending interrupt. The granted processor core 210 can resume execution of its current task 305 once execution of the interrupt handler 134 is complete.

At operation 580, the interrupt controller 220 can update its assignment of the preferred processor core 210. The arbiter message 430A, 430B granting the interrupt to a processor core 210 may be examined by the interrupt controller 220. If the arbiter message does not assign the pending interrupt to the preferred processor core 210, then the interrupt controller 220 can update its assignment of the preferred processor core 210, so that the processor core 210 that has been granted control of the pending interrupt can become the new preferred processor core 210. This updated preferred processing core 210 can be used during the next instance of the specific interrupt. The process 500 can terminate after operation 580.

Figure 6:
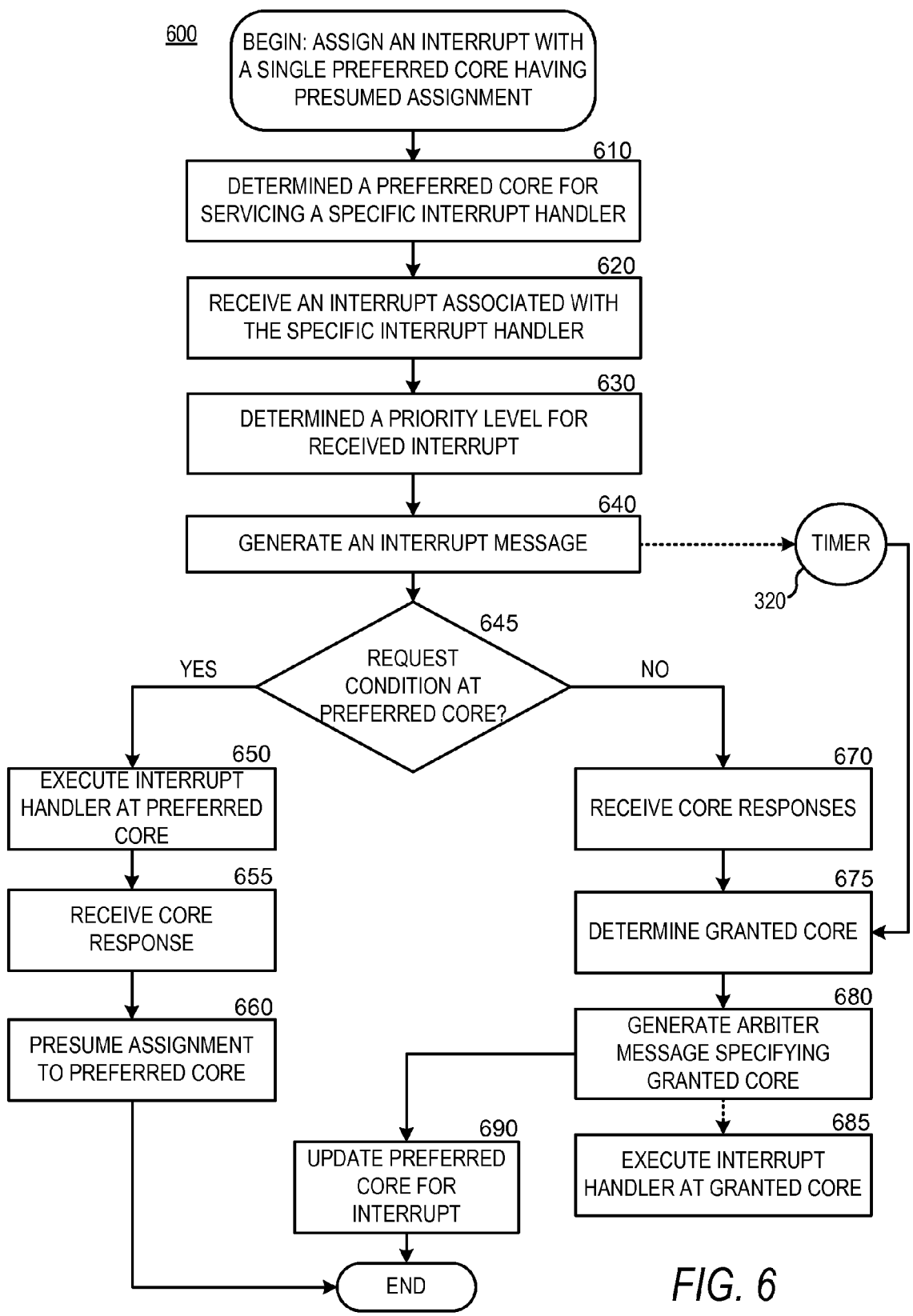
FIG. 6 is a flow diagram illustrating a process for assigning an interrupt with a single preferred processor core having presumed assignment.

Referring now to FIG. 6, additional details will be provided regarding the embodiments presented herein for the allocation of interrupts within multiprocessors. In particular, FIG. 6 is a flow diagram illustrating aspects of a process 600 for assigning an interrupt with a single preferred processor core having presumed assignment according to aspects of an embodiment presented herein.

The process 600 begins at operation 610, where a preferred core is determined for preferably servicing a specific interrupt handler 134. Initially, a preferred core for a specific interrupt handler 134 may be randomly assigned, pre-specified as a particular core, or assigned through any other initialization mechanism. The initialization may be specified by the operating system, by the BIOS, or by a configuration setting or circuit.

Next, at operation 620, an interrupt associated with the specific interrupt handler 134 is received. The received interrupt can arrive on interrupt lines 225 to the interrupt controller 220. At operation 630, a priority level for the received interrupt can be determined. At operation 640, an interrupt message 410A can be generated. The interrupt message 410A can be generated by the interrupt controller 220 and transmitted on the interrupt bus 215. The interrupt message 410A can indicate the interrupt priority level as determined in operation 630 and also the preferred core ID as determined in operation 510. The generation of the interrupt message 410A and transmission onto the interrupt bus 215 can also trigger the beginning of a time period associated with a timer 320.

Upon arrival of the interrupt messages 410A at the processor cores 210, each local interrupt controller 330 can evaluate if the respective processor core 210 is going to request the interrupt. This determination may be based on the interrupt having a higher priority than the current task 305 executing on the processor core 210. At operation 645, the local interrupt controller 330 associated with the preferred processor core can determine if the preferred core will be requesting the interrupt.

If the preferred core will be requesting the interrupt, the process 600 can transition to operation 650 where the preferred core presumptively begins to execute the interrupt handler 134 without waiting upon additional interaction with the interrupt controller 220 or interrupt request arbiter 310. The local interrupt controller 330 associated with the preferred processor core 210 may still generate a core response message 420 indicating that the preferred processor core 210 is taking the interrupt. At operation 655, this core response message 420 can be received by the interrupt request arbiter 310. At operation 660, the interrupt request arbiter 310 can presume that the preferred core is automatically executing the interrupt handler 134 since a "request" core response message 420 was received from the preferred core. The interrupt request arbiter 310 can then generate an arbiter message 430A, 430B specifying the preferred core as the granted processor core 210 to the other local interrupt controllers 330. The process can terminate after operation 660.

If instead, it is determined at operation 645 that the preferred core will not be requesting the interrupt, the process 600 can transition to operation 670 where core response messages 420 may be received at the interrupt request arbiter 310 as well as at the interrupt controller 220.

At operation 675, the interrupt request arbiter 310 can determine a granted core for executing the interrupt service handler 134 associated with the pending interrupt. This determination can be made based on core responses 420 received at operation 670. The core responses 420 received at operation 670 may be ignored if they are received after a time-out period associated with the timer 320. A requesting processor core 210 can be said to be an accepting processor for servicing the interrupt.

At operation 680, an arbiter message 430A, 430B can be generated specifying the granted processor core 210. The arbiter message 430A, 430B can be communicated over the interrupt bus 215 to the local interrupt controllers 330 associated with the respective processor cores 210. At operation 685, the granted processor core 210 can be triggered to execute the interrupt handler 134 to service the pending interrupt. The granted processor core 210 can resume execution of its current task 305 once execution of the interrupt handler 134 is complete.

At operation 690, the interrupt controller 220 can update its assignment of the preferred processor core 210. The arbiter message 430A, 430B granting the interrupt to a processor core 210 may be examined by the interrupt controller 220. If the arbiter message does not assign the pending interrupt to the preferred processor core 210, the interrupt controller 220 can update its assignment of the preferred processor core 210 so that the processor core 210 that has been granted control of the pending interrupt becomes the new preferred processor core 210. This updated preferred processing core 210 can be used during the next instance of the specific interrupt. The process 600 can terminate after operation 690.

Figure 7:
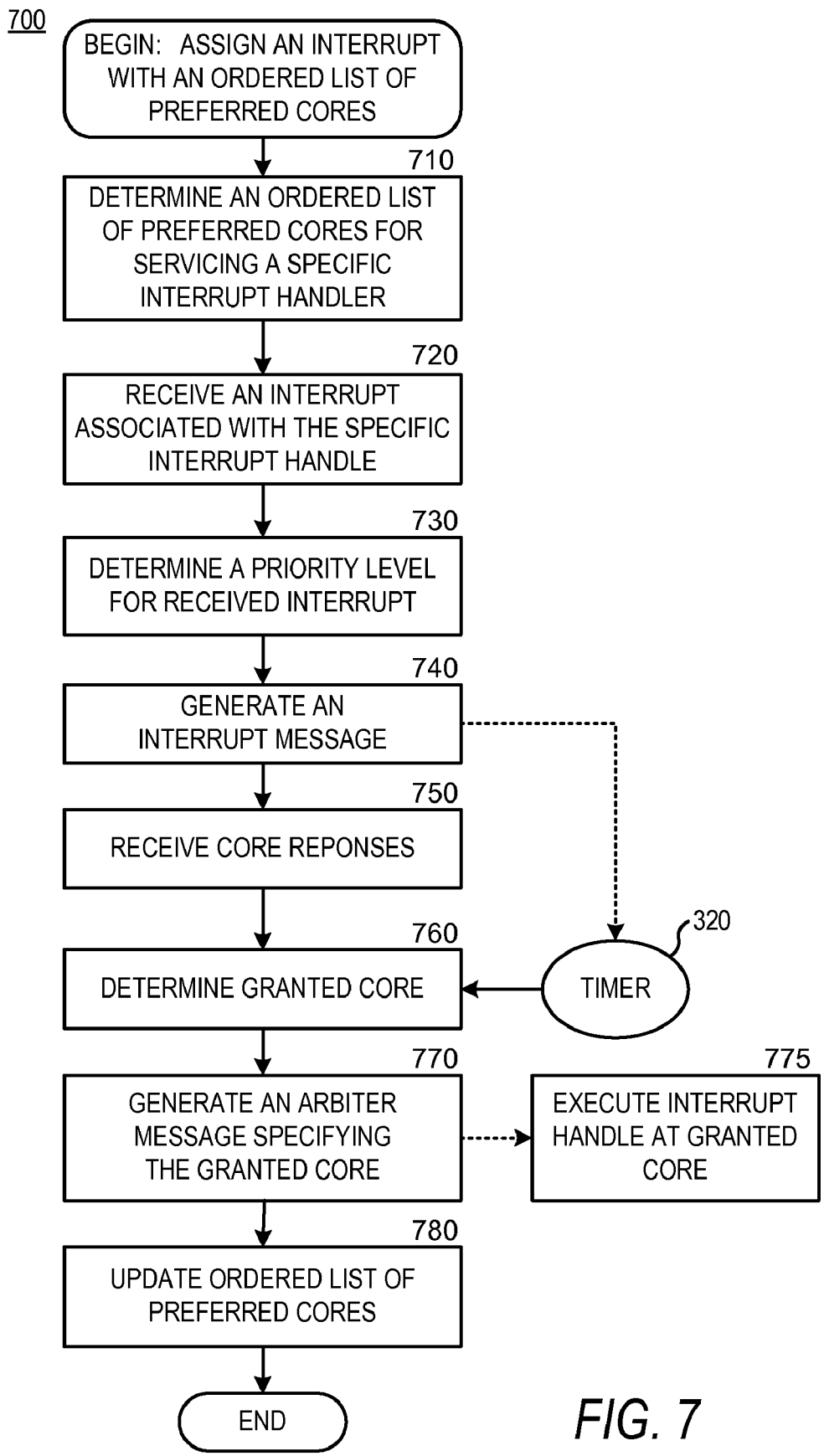
FIG. 7 is a flow diagram illustrating a process for assigning an interrupt with an ordered list of preferred processor cores.

Referring now to FIG. 7, additional details will be provided regarding the embodiments presented herein for the allocation of interrupts within multiprocessors. In particular, FIG. 7 is a flow diagram illustrating aspects of a process 700 for assigning an interrupt using an ordered list of preferred processor cores according to aspects of an embodiment presented herein. The process 700 begins at operation 710, where an ordered list of preferred cores is determined for preferably servicing a specific interrupt handler 134. Initially the ordered list of preferred cores for a specific interrupt handler 134 may be randomly assigned, pre-specified as a particular core list, or assigned through any other initialization mechanism. The initialization may be specified by the operating system, by the BIOS, or by a configuration setting or circuit.

Next at operation 720, an interrupt associated with the specific interrupt handler 134 is received. The received interrupt can arrive on interrupt lines 225 to the interrupt controller 220. At operation 730, a priority level for the received interrupt can be determined. At operation 740, an interrupt message 410B can be generated. The interrupt message 410B can be generated by the interrupt controller 220 and transmitted on the interrupt bus 215. The interrupt message 410B can indicate the interrupt priority level as determined in operation 730. The interrupt message 410B can also indicate the ordered list of preferred processor cores 210 as determined in operation 710. The generation of the interrupt message 410B and transmission onto the interrupt bus 215 can also trigger the beginning of a time period associated with a timer 320.

Upon arrival of the interrupt messages 410B at the processor cores 210, each local interrupt controller 330 can evaluate if the respective processor core 210 is going to request the interrupt. This may be based on the interrupt having a higher priority than the current task 305 executing on the processor core 210. The local interrupt controller 330 can then generate a core response message 420 to be communicated onto the interrupt bus 215. At operation 750, core response messages 420 may be received at the interrupt request arbiter 310. The core response messages 420 may also be received at the interrupt controller 220.

At operation 760, the interrupt request arbiter 310 can determine a granted core for executing the interrupt service handler 134 associated with the pending interrupt. This determination can be made based on core responses 420 received at operation 750. The core responses 420 received at operation 750 may be ignored if they are received after a time-out period associated with the timer 320. A "request" core response 420 from the most preferred core or the ordered list can determine the interrupt assignment. The interrupt can be assigned to the highest ranking preferred core on the ordered list among the cores that request the interrupt. A requesting processor core 210 can be said to accept control of the interrupt.

At operation 770, an arbiter message 430A, 430B can be generated thus specifying the granted processor core 210. The arbiter message 430A, 430B can be communicated over the interrupt bus 215 to the local interrupt controllers 330 associated with the respective processor cores 210. At operation 775, the granted processor core 210 can be triggered to execute the interrupt handler 134 to service the pending interrupt. The granted processor core 210 can resume execution of its current task 305 once execution of the interrupt handler 134 is complete.

At operation 780, the interrupt controller 220 can update its ordered list of preferred processor cores 210. The arbiter message 430A, 430B granting the interrupt to a processor core 210 may be examined by the interrupt controller 220. If the arbiter message does not assign the pending interrupt to the most preferred processor core 210, the interrupt controller 220 can update its assignment of the preferred processor core 210 so that the processor core 210 that has been granted control of the pending interrupt moves up the ordered list and may become the new most preferred processor core 210 on the list. This update of the ordered list of preferred processing cores 210 can be used during the next instance of the specific interrupt. The process 700 can terminate after operation 780.

Figure 8:
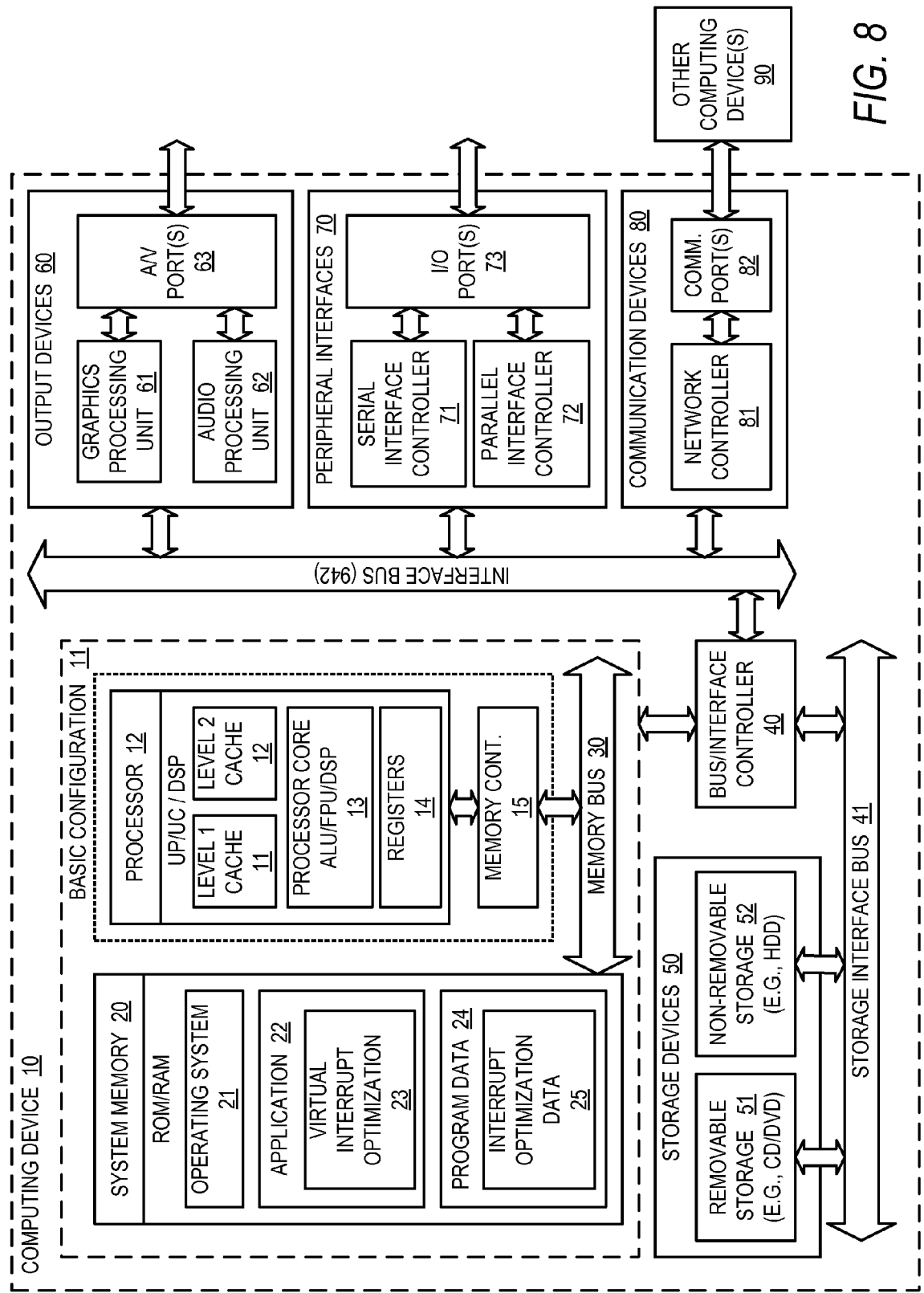
FIG. 8 is a block diagram illustrating an exemplary computing system, all arranged in accordance with the present disclosure.

Turning now to FIG. 8, a block diagram illustrates an example computing device 10 that is arranged for multiprocessor interrupt optimization in accordance with the present disclosure. In a very basic configuration 11, computing device 10 typically includes one or more processors 12 and system memory 20. A memory bus 30 may be used for communicating between the processor 12 and the system memory 20.

Depending on the desired configuration, processor 12 may be of any type including but not limited to a microprocessor (µP), a microcontroller (µC), a digital signal processor (DSP), or any combination thereof. Processor 12 may include one more levels of caching, such as a level one cache 16 and a level two cache 17, a processor core 13, and registers 14. An example processor core 13 may include an arithmetic logic unit (ALU), a floating point unit (FPU), a digital signal processing core (DSP Core), or any combination thereof. An example memory controller 15 may also be used with the processor 12, or in some implementations the memory controller 15 may be an internal part of the processor 12.

Depending on the desired configuration, the system memory 20 may be of any type including but not limited to volatile memory (such as RAM), non-volatile memory (such as ROM, flash memory, etc.) or any combination thereof. System memory 20 may include an operating system 21, one or more applications 22, and program data 24. Application 22 may include a virtual multiprocessor interrupt optimization 23 that is arranged to support a virtualization of multiple processors, or a multiprocessor, supported by the interrupt optimization disclosed herein. Program Data 24 includes multiprocessor interrupt optimization data 25, as will be further described below. In some embodiments, application 22 may be arranged to operate with program data 24 on an operating system 21 such that a multiprocessor with interrupt optimization, as discussed herein, may be operated as a virtual computing environment on the computing device 10. The computing device 10 may also support one or more multiprocessors as its processor 12. One or more of these multiprocessors may feature interrupt optimization as discussed herein. The described basic configuration is illustrated in FIG. 8 by those components within dashed line 11.

Computing device 10 may have additional features or functionality, and additional interfaces to facilitate communications between the basic configuration 11 and any required devices and interfaces. For example, a bus/interface controller 40 may be used to facilitate communications between the basic configuration 11 and one or more data storage devices 50 via a storage interface bus 41. The data storage devices 50 may be removable storage devices 51, non-removable storage devices 52, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 20, removable storage 51 and non-removable storage 52 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 10. Any such computer storage media may be part of device 10.

Computing device 10 may also include an interface bus 42 for facilitating communication from various interface devices (e.g., output interfaces, peripheral interfaces, and communication interfaces) to the basic configuration 11 via the bus/interface controller 40. Example output devices 60 include a graphics processing unit 61 and an audio processing unit 62, which may be configured to communicate to various external devices such as a display or speakers via one or more A/V ports 63. Example peripheral interfaces 70 include a serial interface controller 71 or a parallel interface controller 72, which may be configured to communicate with external devices such as input devices (e.g., keyboard, mouse, pen, voice input device, touch input device, etc.) or other peripheral devices (e.g., printer, scanner, etc.) via one or more I/O ports 73. An example communication device 80 includes a network controller 81, which may be arranged to facilitate communications with one or more other computing devices 90 over a network communication link via one or more communication ports 82.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 10 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 10 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, components, apparatuses, or assemblies, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

What is claimed is:

1. A method for handling interrupts within a multiprocessor computing system, the method comprising:
   establishing a preferred processor list for executing an interrupt handler within the multiprocessor computing system, wherein the preferred processor list comprises two or more processors within the multiprocessor computing system ordered by preference to execute the interrupt handler;
   receiving an interrupt associated with the interrupt handler;
   responsive to receiving the interrupt, determining an interrupt priority level of the interrupt handler;
   broadcasting an interrupt message containing the interrupt priority level to at least the two or more processors in the preferred processor list;
   receiving acceptance messages from one or more accepting processors within the multiprocessor computing system in response to the interrupt message, wherein the one or more accepting processors comprise processors that are idle or are currently executing a task having a lower priority level than the interrupt priority level; and
   responsive to receiving the acceptance messages, assigning, using an arbiter, the interrupt handler to a preferred processor in the one or more accepting processors having a higher preference according to the preferred processor list.

2. The method of claim 1, wherein assigning the interrupt handler to the preferred processor comprises assigning the interrupt handler to the preferred processor in response to the preferred processor being one of the one or more accepting processors.

3. A system for handling interrupts within a multiprocessor computing system, the system comprising:
   a plurality of processor cores;
   an interrupt line for requesting interrupt service from the multiprocessor; and
   an interrupt controller module operable to
     establish a preferred processor core for executing an interrupt handler within the plurality of processor cores,
     receive the interrupt from the interrupt line,
     when the interrupt is received, determine an interrupt priority level of the interrupt handler,
     broadcast an interrupt message containing the interrupt priority level to the plurality of processor cores;
     receive response messages from the plurality of processor cores in response to the interrupt message, wherein the response messages comprise an acceptance message that accepts execution of the interrupt handler based on the interrupt priority level and a rejection message that rejects execution of the interrupt handler based on the interrupt priority level;
     allocate the interrupt to the preferred processor core if the acceptance message is received from the preferred processor core; and
     allocate the interrupt to another processor core if the rejection message is received from the preferred processor core.

4. The system of claim 3, wherein the acceptance message indicates that a corresponding processor is idle or is currently executing a task having a lower priority level than the interrupt priority level.

5. The system of claim 3, wherein the preferred processor core is the most recent processor to service the interrupt.

6. The system of claim 3, wherein to allocate the interrupt to another processor core if the rejection message is received from the preferred processor core, the interrupt controller module is further operable to update the other processor core as a new preferred processor core.

7. The system of claim 3, wherein a maximum time window is specified for receiving the response message; and wherein the interrupt controller module is further operable to allocate the interrupt to another processor core if the maximum time window has passed before receiving the response message from the preferred processor core.

8. The system of claim 3, wherein the interrupt controller module is further operable to transmit arbiter messages to the plurality of processor cores, wherein one of the arbiter messages is a grant message to one of the plurality of processor cores to which the interrupt is allocated, and wherein a remainder of the arbiter messages are deny messages to a remainder of the plurality of processor cores to which the interrupt is not allocated.

9. A computer storage medium having computer-executable instructions stored thereon which, when executed by a computer system, cause the computer system to:
   establish a preferred processor core for executing an interrupt handler within a plurality of processor cores including a second processor core;
   receive an interrupt associated with the interrupt handler;
   when the interrupt is received, determine an interrupt priority level of the interrupt handler;
   broadcast an interrupt message containing the interrupt priority level to the plurality of processor cores;
   receive response messages from the plurality of processor cores in response to the interrupt message, wherein the response messages comprise an acceptance message that accepts execution of the interrupt handler based on the interrupt priority level and a rejection message that rejects execution of the interrupt handler based on the interrupt priority level;
   assign, using an arbiter, the interrupt handler to the second processor core instead of the preferred processor core if the rejection message is received from the preferred processor core; and
   update the second processor core to replace the preferred processor core as a new preferred processor core in response to assignment of the interrupt handler to the second processor using the arbiter.

10. The computer storage medium of claim 9, wherein the preferred processor core is specified by a list of preferred processor cores ordered by preference to execute the interrupt handler.

11. The computer storage medium of claim 10, the second processor core has a lower preference than the preferred processor core in the list of preferred processor cores.

12. The computer storage medium of claim 9, wherein the computer-executable instructions, when executed by the computer system, further cause the computer system to transmit arbiter messages to the plurality of processor cores, wherein one of the arbiter messages is a grant message to one of the plurality of processor cores to which the interrupt is allocated, and wherein a remainder of the arbiter messages are deny messages to a remainder of the plurality of processor cores to which the interrupt is not allocated.

13. A method for optimizing external interrupts for multiple processors, the method comprising:
   receiving, using a local interrupt controller, an offer to execute an interrupt handler associated with an interrupt from a master interrupt controller associated with multiple processors, the local interrupt controller associated with a preferred processor in the multiple processors, the offer specifying a priority level of the interrupt handler;

determining, using the local interrupt controller, whether the preferred processor executes a task having a lower priority level than the specified priority level of the interrupt handler;

transmitting, using the local interrupt controller, a request for control of the offered interrupt to an interrupt arbiter in response to determining that the preferred processor executes the task having the lower priority level than the specified priority level of the interrupt handler;

receiving, using the local interrupt controller, a grant from the interrupt arbiter in response to the request for control; and executing, using the preferred processor, the interrupt handler in response to receiving the grant from the interrupt arbiter.

14. The method of claim 1, further comprising:

updating the preferred processor list if the preferred processor having the higher preference according to the preferred processor list is different from another processor having a highest preference according to the preferred processor list.

15. The method of claim 1, wherein the preferred processor list orders the two or more processors according to estimates of cache state with respect to the interrupt handler.

16. The method of claim 1, further comprising:

receiving rejection messages from a plurality of rejecting processors within the multiprocessor computing system in response to the interrupt message, wherein the plurality of rejecting processors comprise processors that are currently executing a task having a higher priority level than the interrupt priority level.

17. The method of claim 1, wherein the interrupt message further contains the preferred processor list in addition to the interrupt priority level.

18. The method of claim 1, wherein broadcasting the interrupt message to at least the two or more processors in the preferred processor list comprises broadcasting the interrupt message to only the two or more processors in the preferred processor list.

19. The system of claim 3, wherein the interrupt controller module is further operable to allocate the interrupt to the preferred processor core if a first acceptance message from the other processor core is received before a second acceptance message from the preferred processor core.

20. The computer storage medium of claim 9, wherein the computer-executable instructions, when executed by the computer system, further cause the computer system to allocate the interrupt to the preferred processor core if the acceptance message is received from the preferred processor core.

21. The method of claim 13, further comprising transmitting, using the local interrupt controller, a rejection message rejecting control of the offered interrupt to the interrupt arbiter in response to determining that the preferred processor does not execute the task having the lower priority level than the specified priority level of the interrupt handler.

22. The method of claim 21, further comprising receiving, using the local interrupt controller, a deny message from the interrupt arbiter in response to the rejection message, wherein the deny message denies the preferred processor of control of the offered interrupt.

23. The method of claim 13, wherein the offer further specifies an identifier of the preferred processor.

* * * * *